United States Patent
Bangolae et al.

(10) Patent No.: US 9,313,812 B2
(45) Date of Patent: Apr. 12, 2016

(54) USER EQUIPMENT AND EVOLVED NODE-B SUPPORTING MACHINE TYPE COMMUNICATION AND SMALL DATA COMMUNICATION

(71) Applicant: Intel IP Corporation, Santa Clara, CA (US)

(72) Inventors: Sangeetha L. Bangolae, Beaverton, OR (US); Marta Martinez Tarradell, Hillsboro, OR (US); Puneet Jain, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/313,818

(22) Filed: Jun. 24, 2014

(65) Prior Publication Data

US 2015/0029918 A1    Jan. 29, 2015

Related U.S. Application Data

(60) Provisional application No. 61/859,121, filed on Jul. 26, 2013.

(51) Int. Cl.
*H04W 76/00* (2009.01)
*H04W 76/02* (2009.01)
(Continued)

(52) U.S. Cl.
CPC ........... *H04W 76/02* (2013.01); *H04J 11/0023* (2013.01); *H04L 5/14* (2013.01);
(Continued)

(58) Field of Classification Search
CPC ..... H04J 11/0023; H04L 5/14; H04L 5/0007; H04L 69/16; H04W 4/005; H04W 16/28; H04W 24/02; H04W 24/08; H04W 36/0066; H04W 36/0083; H04W 52/0209; H04W 72/0413; H04W 72/082; H04W 74/0833; H04W 76/02; H04W 76/021; H04W 76/023; H04W 76/046; H04W 84/12; H04W 88/06; H04W 88/08
See application file for complete search history.

(56) References Cited

U.S. PATENT DOCUMENTS

2011/0216719 A1* 9/2011 Faurie et al. ............ 370/329
2012/0155312 A1  6/2012 Kim et al.
(Continued)

FOREIGN PATENT DOCUMENTS

WO   WO-2011100570 A1   8/2011
WO   WO-2011119680 A2   9/2011
(Continued)

OTHER PUBLICATIONS

"3 GPP; Technical Specification Group Radio Access Network; Universal Terrestrial Radio Access and Evolved Universal Terrestrial Radio Access; Radio measurement collection for Minimization of Drive Tests; Overall description Stage 2 (Release 11)", 3GPP TS 37.320 V11.2.0, (Dec. 2012), 22 pgs.
(Continued)

*Primary Examiner* — Curtis A Alia
(74) *Attorney, Agent, or Firm* — Schwegman Lundberg & Woessner, P.A.

(57) ABSTRACT

Embodiments of a User Equipment (UE) and method for selecting a Radio Resource Control (RRC) inactivity timer for a service operating in a wireless network are generally described herein. In some embodiments, the UE may be configured to operate in a 3GPP network in accordance with a Radio Resource Control (RRC) inactivity timer that controls RRC state transitions of the UE, and further in accordance with a Machine Type Communication (MTC) mode of operation. The UE may receive, from an Evolved Node-B (eNB), one or more messages that may include an RRC inactivity timer keep connected support value that indicates support of a keep connected mode. In some embodiments, when the UE operates in keep connected mode, the UE operates in an RRC connected state and is restricted from operating in other RRC states.

24 Claims, 7 Drawing Sheets

(51) Int. Cl.

| | | |
|---|---|---|
| *H04W 52/02* | (2009.01) | |
| *H04W 4/00* | (2009.01) | |
| *H04L 5/14* | (2006.01) | |
| *H04W 76/04* | (2009.01) | |
| *H04W 36/00* | (2009.01) | |
| *H04W 24/08* | (2009.01) | |
| *H04W 72/08* | (2009.01) | |
| *H04W 72/04* | (2009.01) | |
| *H04W 74/08* | (2009.01) | |
| *H04L 29/06* | (2006.01) | |
| *H04W 24/02* | (2009.01) | |
| *H04W 16/28* | (2009.01) | |
| *H04J 11/00* | (2006.01) | |
| *H04W 84/12* | (2009.01) | |
| *H04W 88/06* | (2009.01) | |
| *H04W 88/08* | (2009.01) | |
| *H04L 5/00* | (2006.01) | |

(52) U.S. Cl.
CPC ............ *H04L 69/16* (2013.01); *H04W 4/005* (2013.01); *H04W 16/28* (2013.01); *H04W 24/02* (2013.01); *H04W 24/08* (2013.01); *H04W 36/0066* (2013.01); *H04W 36/0083* (2013.01); *H04W 52/0209* (2013.01); *H04W 72/0413* (2013.01); *H04W 72/082* (2013.01); *H04W 74/0833* (2013.01); *H04W 76/021* (2013.01); *H04W 76/023* (2013.01); *H04W 76/046* (2013.01); *H04L 5/0007* (2013.01); *H04W 84/12* (2013.01); *H04W 88/06* (2013.01); *H04W 88/08* (2013.01)

(56) References Cited

U.S. PATENT DOCUMENTS

| | | | |
|---|---|---|---|
| 2013/0080597 A1* | 3/2013 | Liao | 709/219 |
| 2013/0100895 A1* | 4/2013 | Aghili et al. | 370/329 |
| 2013/0115983 A1* | 5/2013 | Ronneke et al. | 455/466 |
| 2014/0094127 A1* | 4/2014 | Dimou et al. | 455/67.11 |

FOREIGN PATENT DOCUMENTS

| | | |
|---|---|---|
| WO | WO-2012060602 A2 | 5/2012 |
| WO | WO-2012134198 | 10/2012 |
| WO | WO-2013006219 A1 | 1/2013 |
| WO | WO-2013042883 | 3/2013 |
| WO | WO-2012099369 | 7/2014 |
| WO | WO-2015012900 A1 | 1/2015 |
| WO | WO-2015013038 A1 | 1/2015 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.4.0, (Mar. 2014), 362 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, (Dec. 2012), 208 pgs.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, (Dec. 2012), 340 pgs.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.7.0, (Mar. 2014), 350 pgs.

"3rd Generation Partnership Project; Technical Specification Group Radio Access Network; Evolved Universal Terrestrial Radio Access (E-UTRA); User Equipment (UE) radio access capabilities (Release 10)", 3GPP TS 36.306 V10.11.0, (Dec. 2013), 25 pgs.

"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.6.0, (Dec. 2013), 274 pgs.

"3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.9.0, (Mar. 2014), 286 pgs.

"3rd Generation Partnership Project; Technical Specification Group Services and System Aspects; Study on Machine-Type Communications (MTC) and other mobile data applications communications enhancements (Release 12)", 3GPP TR 23.887 V12.0.0, (Dec. 2013), 151 pgs.

"3rd Generation Partnership Project; Technical Specification Group Services and System Aspects; Telecommunication management; Study on NM Centralized Coverage and Capacity Optimization (CCO) SON Function (Release 12)", 3GPP TR 32.836 V0.5.0, (May 2013), 16 pgs.

"3rd Generation Partnership Project; Technical Specification Group Services and System Aspects; Telecommunication management; Subscriber and equipment trace; Trace control and configuration management", 3GPP TS 32.422 V11.6.0, (Dec. 2012), 131 pgs.

"U.S. Appl. No. 14/778,511, Preliminary Amendment filed Sep. 18, 2015", 8 pgs.

"International U.S. Appl. No. PCT/US2014/032190, International Search Report mailed Jul. 25, 2014", 4 pgs.

"International U.S. Appl. No. PCT/US2014/032190, Written Opinion mailed Jul. 25, 2014", 6 pgs.

"International U.S. Appl. No. PCT/US2014/045903, International Search Report mailed Oct. 27, 2014", 5 pgs.

"International U.S. Appl. No. PCT/US2014/045903, Written Opinion mailed Oct. 27, 2014", 5 pgs.

Zou, Wei, et al., "Small data transmission at the detached machine-type-communication device", IEEE, Personal Indoor and Mobile Radio Communications (PIMRC), 2012 IEEE 23rd International Symposium on, (Sep. 2012), 13-17.

\* cited by examiner

USER EQUIPMENT AND EVOLVED NODE-B SUPPORTING MACHINE TYPE COMMUNICATION AND SMALL DATA COMMUNICATION

PRIORITY CLAIM

This application claims the benefit of priority under 35 U.S.C. 119(e) to U.S. Provisional Patent Application Ser. No. 61/859,121, filed Jul. 26, 2013 which is incorporated herein by reference in its entirety.

TECHNICAL FIELD

Embodiments pertain to wireless communications. Some embodiments relate to wireless networks or mobile devices configured to operate in accordance with 3GPP standards. Some embodiments pertain to wireless networks, User Equipment (UE) devices, Evolved Node-B (eNB) devices or other mobile devices that support small data transfer communication or Machine Type Communication (MTC) services.

BACKGROUND

Traditionally, many mobile devices offer services such as voice communication, text messaging, and various data services, such as streaming video. Devices and networks that support the data services are typically designed to provide a user of the device with nearly constant access to the services and maximum data rates while using them. While these services will likely continue to be in high demand, another class of services related to Machine Type Communication (MTC) has been emerging. In general, MTC takes place between devices without the need for human involvement or intervention. Some examples of MTC include communication between appliances or other devices in the home.

In contrast to traditional data services like streaming video, MTC services tend to require exchanging of blocks of data that are relatively small. In addition, communication within the MTC services is generally infrequent and delay-tolerant. For example, a thermostat in a home may communicate the indoor temperature to a refrigerator in the next room to assist the refrigerator in selecting its cooling cycle in an efficient manner. The information in that message, the temperature, is a relatively small quantity that need not be constantly or quickly updated in order for the MTC communication to perform its intended purpose, which is to help the refrigerator choose its cooling cycle. Although MTC can be performed using traditional high speed data services like those offered by 3GPP, the high data rates, low latency, and constant connectivity offered by those services are generally not necessary for MTC, and may lead to very inefficient use of the data services. Therefore, methods and systems that enable MTC and other small data communication services are needed.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device can be a User Equipment (UE) configured to operate in accordance with 3GPP standards. In some embodiments, some of the devices described herein may be Evolved Node-B (eNB) devices configured to operate in accordance with 3GPP standards. In some embodiments, the mobile device or other devices described herein may be configured to operate according to other protocols or standards, including IEEE 802.11 or other IEEE standards. In some embodiments, the mobile device or other devices may include one or more of a keyboard, a display, a non-volatile memory port, multiple antennas, a graphics processor, an application processor, speakers, and other mobile device elements. The display may be an LCD screen including a touch screen.

Figure 1:
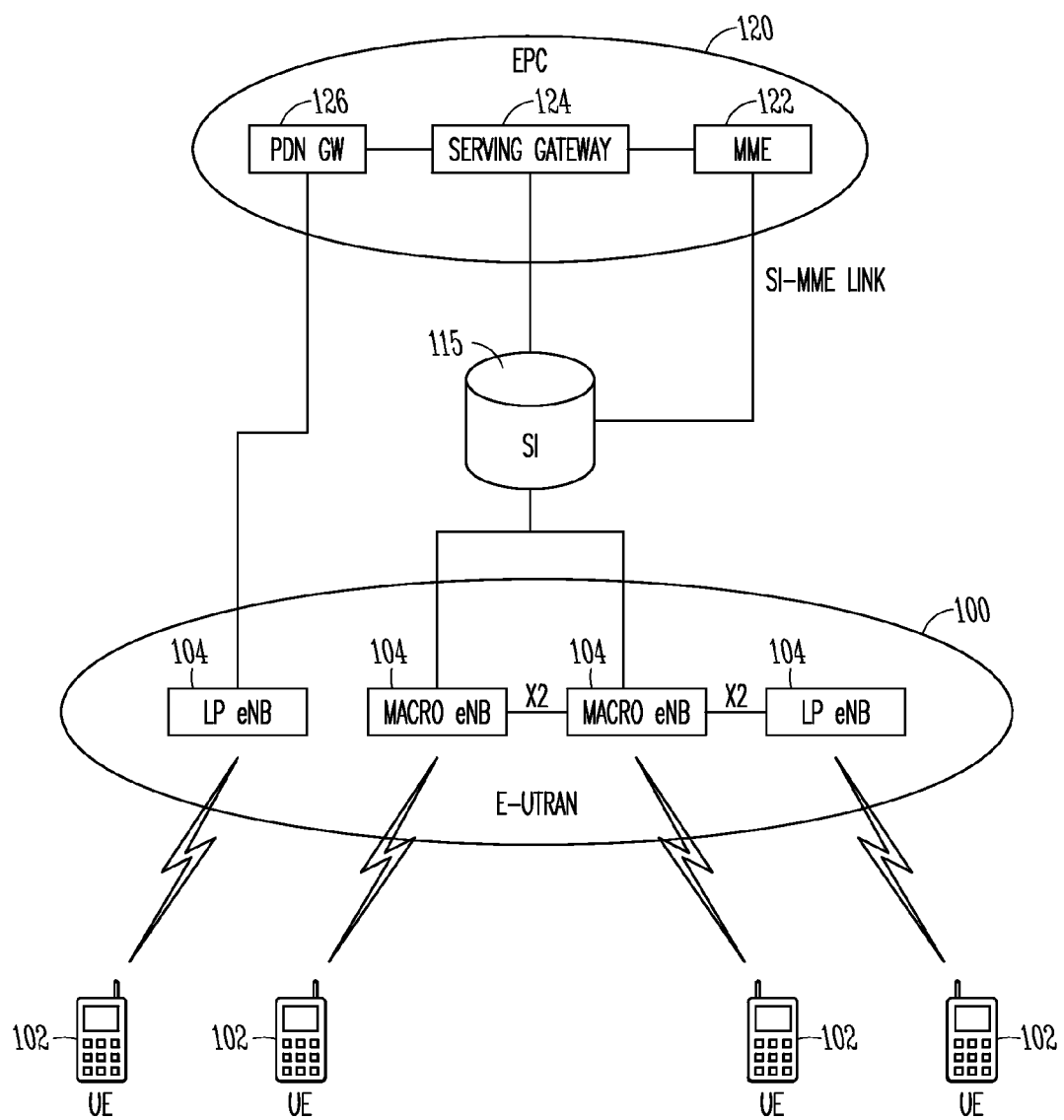
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with user equipment (UE) 102. The eNBs 104 may include macro eNBs, low power (LP) eNBs, pico eNBs or other eNBs that may support small cells as known in the art.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to functions such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
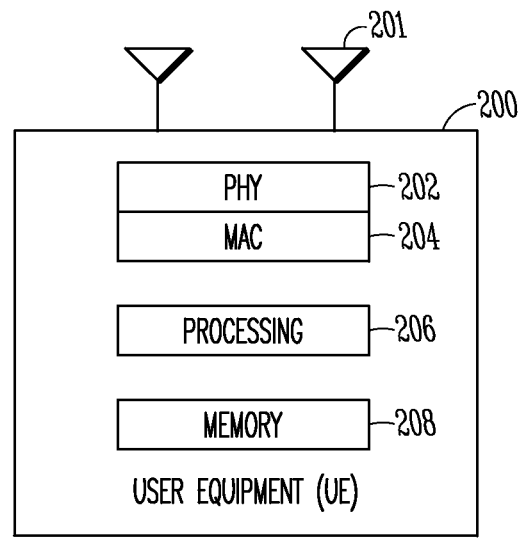
FIG. 2 is a functional diagram of a User Equipment (UE) in accordance with some embodiments.
Figure 3:
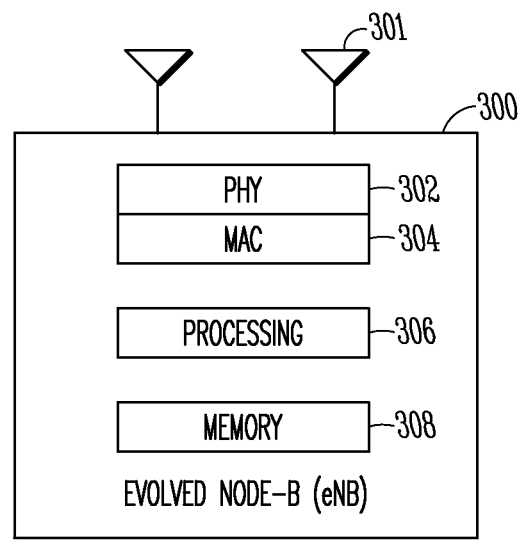
FIG. 3 is a functional diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. The UE 200 may be a UE 102 as depicted in FIG. 1, while the eNB 300 may be an eNB 104 as depicted in FIG. 1. The UE 200 may include physical layer circuitry 202 for transmitting and receiving signals to and from eNB's, other UE's or other devices using one or more antennas 201, while the eNB 300 may include physical layer circuitry 302 for transmitting and receiving signals to and from other eNB's, Core Network (CN) nodes, UE's or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 200 may be configured to operate in a 3GPP network in accordance with a Radio Resource Control (RRC) inactivity timer that controls RRC state transitions of the UE 200. The RRC inactivity timer may also control the amount of time that a UE is allowed to stay in an active mode before entering or being transitioned into an idle mode, which may occur in response to inactivity of the UE or other factors. It should be pointed out that such considerations and specifications related to the RRC inactivity timer may be addressed as part of an implementation of the eNB or UE, and in some cases may not be included as part of the 3GPP or other standards. The UE may be further configured to operate in accordance with a Machine Type Communication (MTC) mode of operation. The UE 200 may receive one or more System Information Block (SIB) or MAC-Main-Config messages from an Evolved Node B (eNB) that is in a communication session with the UE 200. The messages may include an RRC inactivity timer support value that indicates if the communication session supports the use of the RRC inactivity timer and a set of candidate RRC inactivity timer values. The messages may further include an RRC inactivity timer keep connected support value that indicates if the communication session supports a keep connected mode as part of the communication session. In some embodiments, when the UE 200 operates in keep connected mode, the UE 200 operates in an RRC connected state and is restricted from operating in other RRC states. These embodiments are described in more detail below.

In MTC communication sessions, as previously described, communication between one or more devices generally takes place with little or no human involvement. Accordingly, an MTC device may be a mobile device, such as a UE, or other device that supports communication according to an MTC protocol or in an MTC mode of operation. In some embodiments, the MTC device may only support communication according to MTC. As an example, a sensor that transmits data to another sensor or device through MTC may be an MTC device. These embodiments are not limiting, however, as the MTC device, in some embodiments, may support communication according to MTC and other communication protocols, either simultaneously or non-simultaneously. As an example, a UE may enter a mode in which it only communicates according to MTC. As another example, a UE may support an MTC communication session while also supporting a communication session involving voice or data transfer.

MTC typically involves small blocks of data that are exchanged at infrequent rates between the devices. As an example, protocols or services associated with the Internet of Things, as known in the art, may be part of MTC communication as described herein. An MTC communication session or application may be able to utilize standards such as 3GPP, which are designed generally for high data rate, low latency, and near constant connectivity. However, the usage of such standards for MTC communication may require, or at least benefit from, modifications to those standards, and several related challenges will be addressed herein. An RRC inactivity timer in a 3GPP system that may be configured according to one or more network-specific implementations controls the transitioning of a UE from an RRC connected state to an RRC idle state. Upon expiration of the RRC inactivity timer, the UE is transitioned to the RRC idle state for power saving purposes, and is unable to send and receive data from within this mode as per 3GPP release 12 operation. It should be noted that although the discussion here refers to the RRC idle and RRC connected states, it is not limiting and the reference to these particular RRC states is done for illustration of the concepts. In some embodiments, any suitable low power state may be used in place of the RRC idle state described, and an active operational state, including states that may support high volume data transmissions, may be used in place of the RRC connected state described. In addition, the low power and active states need not be a part of the 3GPP standards or related to any RRC states. In order to resume normal sending and receiving of data, the UE must make a transition back to the RRC connected state, a process that requires time and also results in wasteful signaling overhead. In cases like MTC, in which a UE (or other device) may only be sending or receiving data infrequently, it is possible that the UE will frequently be transitioned into the RRC idle state due to inactivity, and will have to suffer the time and overhead associated with transitioning back to the RRC connected state. These problems can be exacerbated when many MTC communication sessions are taking place in the same system. Methods and systems that address this issue will be described herein.

A first general approach to the problem is to allow the UE to remain in the RRC connected state without transitioning back to the RRC idle state so frequently, and in some cases, the UE may remain in this state indefinitely or permanently. As such, the UE may operate in the RRC connected state, or similar state, and may be restricted from operating in, or transitioning to, other RRC states, including other low power states. Such a mode may be referred to as "keep connected mode" or similar, and applying keep connected mode for an MTC communication may provide benefit not only to the UE, but to the network in general, as less of the overall data throughput capabilities of the system may be wasted on frequently connecting this UE back into the system for a transfer of a small block of data. A second general approach to the problem is to allow the UE and the eNB to exchange information related to the desired communication session (MTC or otherwise) and to the UE capabilities in order to facilitate selection of an appropriate value for the RRC inactivity timer. This selection may also realize benefits similar to the first approach.

Figure 4:
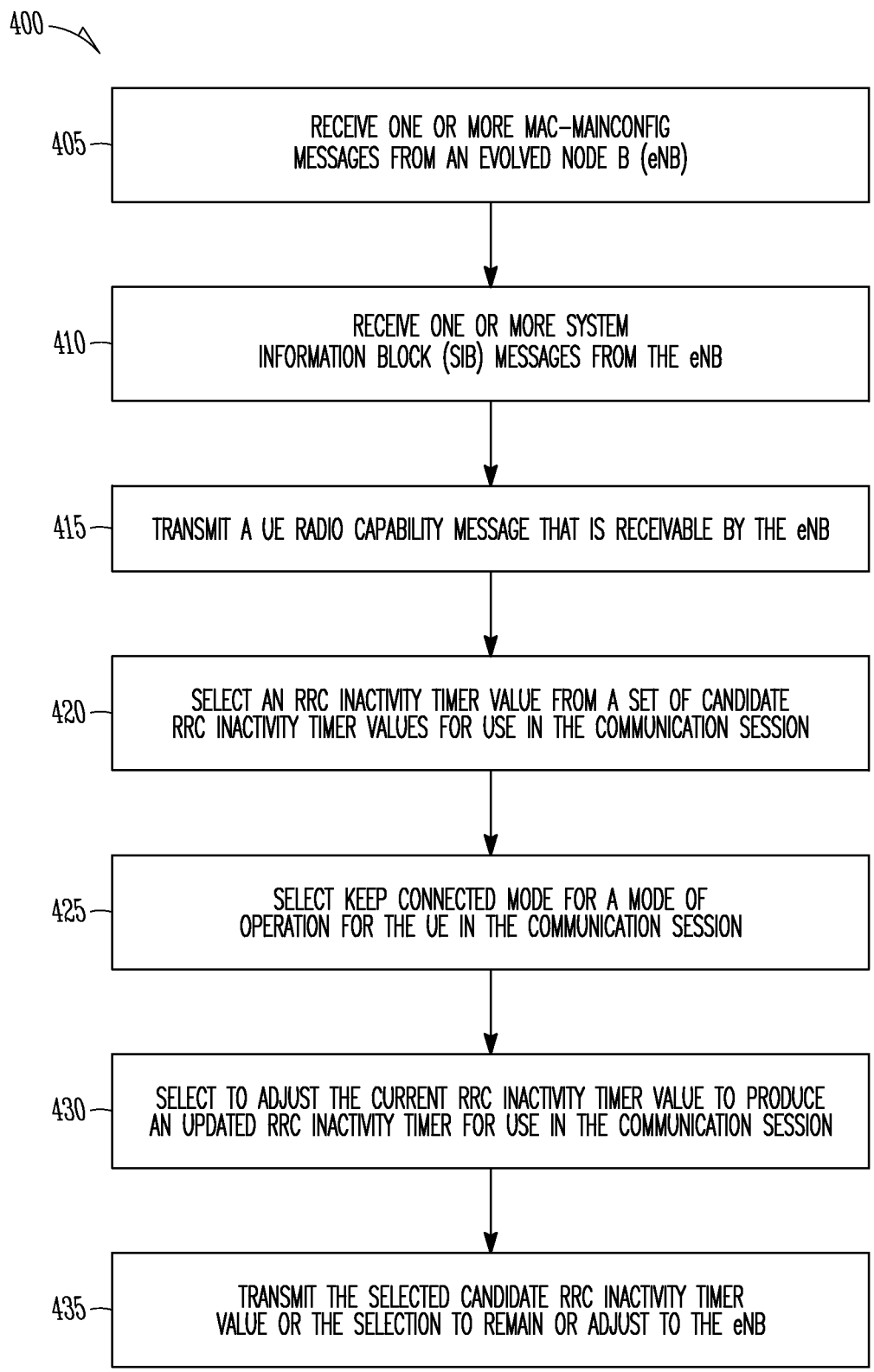
FIG. 4 illustrates the operation of a method for determining an RRC inactivity timer in accordance with some embodiments.

Referring to FIG. 4, a method 400 of enabling the use of keep connected mode at a UE and for determining a Radio Resource Control (RRC) inactivity timer for a communication session is shown. In some embodiments, the communication session may occur between a UE and an eNB, both configured to operate in a 3GPP network. In addition, in some embodiments, the communication session may further operate according to an MTC protocol, but the method 400 is not so limited. The communication session may operate according to other protocols instead of, or in addition to, the MTC protocol. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-8, although it is understood that the method 400 may be practiced with any other suitable systems, interfaces and components. In addition, while the method 400 and other methods described herein may refer to UE's and eNB's configured to operate in accordance with 3GPP standards, embodiments of those methods are not limited to just those UE's and eNB's and may also be practiced on mobile devices or other devices or networks configured to operate according to other standards, including IEEE 802.11 or other IEEE standards.

Figure 5:
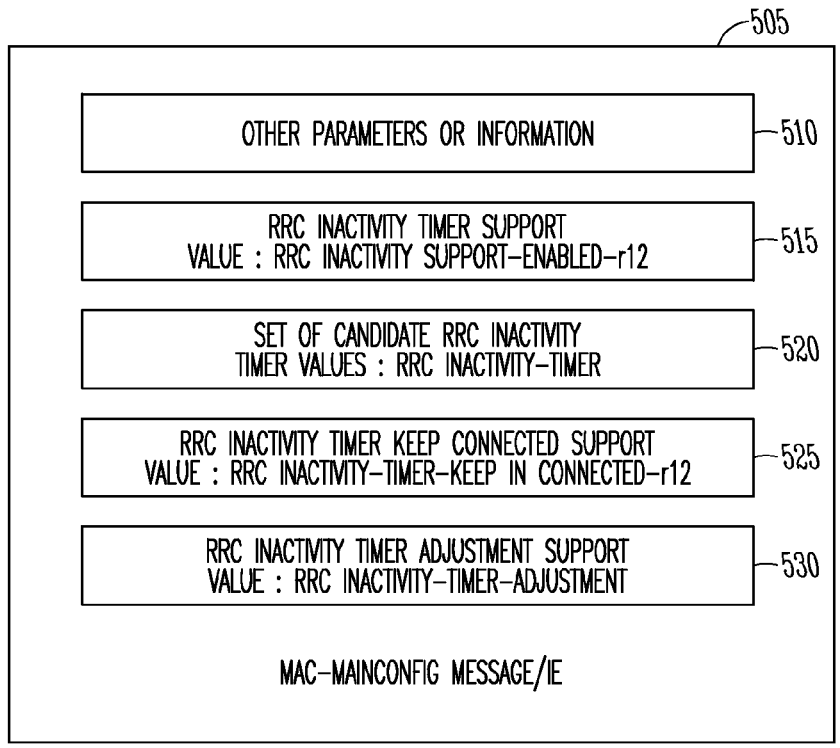
FIG. 5 illustrates an example of a MAC-MainConfig message or Information Element (IE) and an example of a System Information Block (SIB) message or Information Element (IE) in accordance with some embodiments.
Figure 5:
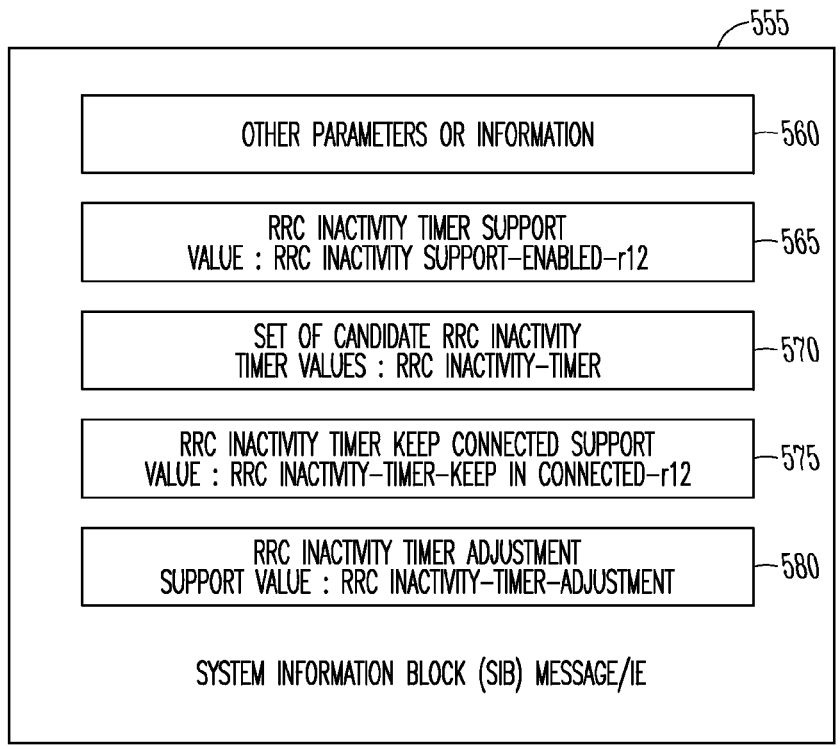

At operation 405, one or more MAC-MainConfig messages may be received at the UE from the eNB, and at operation 410, one or more System Information Block (SIB) messages may be received from the eNB at the UE. The MAC-MainConfig message 505 and SIB messages 555 may also include information or parameters that can enable MTC at the UE, and the information or parameters may enable the UE and eNB to address the possibility of keeping the UE in connected mode indefinitely or permanently, or choosing a better value for the RRC inactivity timer. Examples of these two messages are illustrated in FIG. 5. Each of the MAC-MainConfig message 505 and SIB messages 555 may include one or more information elements (IE's) that can include various parameters to enable not just MTC, but also other communications or tasks. It should be noted that these messages may include more parameters or information than what is shown in FIG. 5, and the parameters or information are not restricted to the order shown in FIG. 5. As an example, additional parameters that may have not yet been determined may be specified by the 3GPP standards in the future, and such parameters may also be included in the MAC-MainConfig message 505 or the SIB message 555.

The MAC-MainConfig message 505 includes other parameters or information 510 that are not necessarily related to MTC, as described above. The MAC-MainConfig message 505 may also include an RRC inactivity timer support value 515, which may be referred to as RRCInactivitySupport-Enabled-r12 or similar. The value of the RRC inactivity timer support value 515 may be Boolean, taking on values such as yes/no, true/false or similar, and may refer to whether or not the UE or eNB supports the use of the RRC inactivity timer. The MAC-MainConfig message 505 may also include a set of candidate RRC inactivity timer values 520, which may be referred to as RRCInactivity-Timer or similar. The candidate RRC inactivity timer values 520 may be enumerated and may take on any suitable number of values in any suitable time units. The MAC-MainConfig message 505 may also include an RRC inactivity timer keep connected support value 525, which may be referred to as RRCInactivity-Timer-Keepin-Connected-r12 or similar, and may be Boolean, taking on values such as yes/no, true/false or similar. In addition, the MAC-MainConfig message 505 may also include an RRC inactivity timer adjustment support value 530, which may be referred to as RRCInactivity-Timer-Adjustment or similar, and may be Boolean, taking on values such as yes/no, true/false or similar. Alternatively, or in addition, the SIB message 555 may include similar information in 560-580. The UE may receive information in either type of message or in both messages.

At operation 415, a UE radio capability message can be transmitted by the UE and may be receivable by the eNB, and may include information that enables the exchanging of data between the UE and the eNB according to the MTC protocol. The UE radio capability message will be described in more detail below, but the discussion here will continue with operation 420, at which an RRC inactivity timer value may be selected. In some embodiments, the RRC inactivity timer value may be selected from the set of candidate RRC inactivity timer values previously described, but the method 400 is not so limited. In some embodiments, the value for the RRC inactivity timer value may be selected from a different set, or may not be part of any set of numbers. The selection may be based on any suitable criteria or may be based on any suitable algorithm performed at the UE, eNB or elsewhere. An example of one such algorithm will be given later.

At operation 425, a selection can be made to use keep connected mode as a mode of operation for the UE in the communication session, a decision that may be based on a determination, through an algorithm or other technique, that the UE may benefit from using keep connected mode. For example, if it is determined that RRC state transitions occur at a frequent rate or that a transition back to the RRC connected state is often necessary before transmitting data, the UE may benefit from and may select to use keep connected mode.

Similarly, at operation 430, a selection can be made on whether to adjust the current RRC inactivity timer value to produce an updated RRC inactivity timer for use in the communication session can be made through any suitable algorithm or technique, including those just described in relation to the use of keep connected mode. The adjustment may be chosen from any suitable set of values, including increase/decrease, yes/no or the like, and in some embodiments the adjustment may include an amount of adjustment in any appropriate time unit.

As previously mentioned, embodiments of the method 400 may not include all operations shown. As an example, some embodiments may only include one of the operations 420, 425, and 430, while some embodiments may include some, none or all of those operations.

The choice of RRC inactivity timer value (updated or otherwise) or the selections just described may be transmitted to the eNB at operation 435. The transmission of the RRC inactivity timer value or the selections may be transmitted in any suitable manner from the UE to the eNB, including the use of one or more Non-Access Stratum (NAS) Protocol Data Unit (PDU) messages or with one or more uplink RRC messages receivable by the eNB. In either case, the messages may include the updated RRC inactivity timer value or the selections. The portion of the uplink RRC messages that includes this information may be similar to the MAC-MainConfig message 505 or the SIB message 555 shown in FIG. 5.

Returning to operation 415 of the method 400, the UE radio capability message can be transmitted by the UE and may be receivable by the eNB or other components operating in the system. The UE radio capability message may include information that enables the exchanging of data between the UE and the eNB according to the MTC protocol. In addition, the UE radio capability message may include additional information that is not necessarily related to the MTC protocol, such as general information or other information related to other aspects or communication modes. As an example, 3GPP standards may already specify, or may specify in the future, other information or parameters that relate to operation of the UE according to 3GPP standards.

A UE radio capability message may be sent from the UE to the eNB in any suitable manner, including the use of Tracking Area Update (TAU) or Attach/Service Request of 3GPP, as known in the art. In some cases, the eNB may trigger the sending of the radio capability message by sending a radio capability enquiry message to the UE. Once the UE radio capability message is received, the eNB may transfer the information within the message to the MME or other component.

Figure 6:
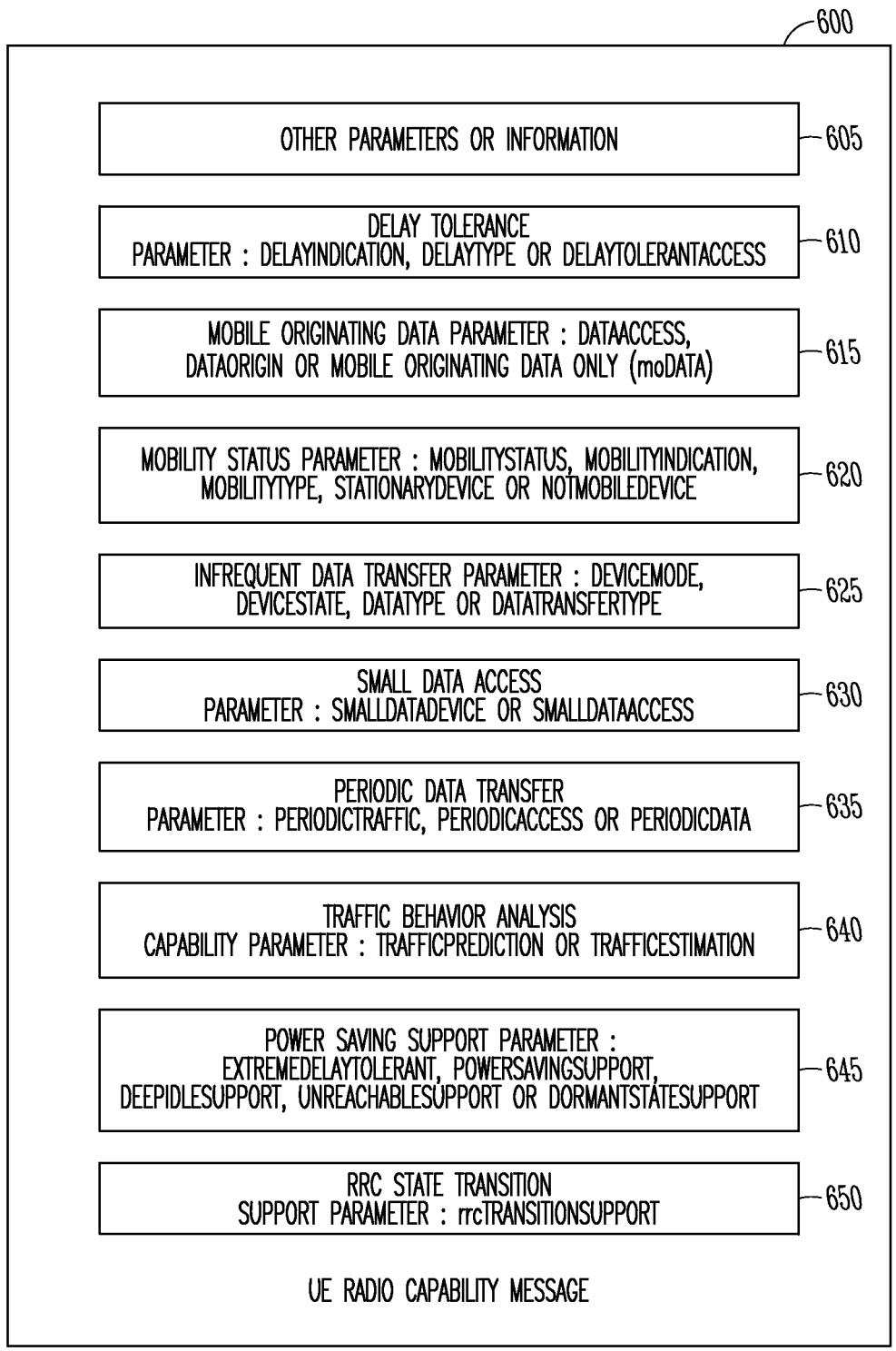
FIG. 6 illustrates an example of a UE Radio Capability Message in accordance with some embodiments.

An example of a UE radio capability message 600 is shown in FIG. 6. It should be noted that in some embodiments, the message may include fewer or additional parameters, and the parameters included in the UE radio capability message 600 are not limited to the order shown and may be included in any order. As previously described, other parameters or information 605 may be included in the message 600. The additional parameters described below may enable the UE to exchange data with the eNB according to the MTC protocol. The parameters may take on Boolean values (yes/no, true/false or the like), numbers, a combination of the two or any other suitable characterization. For example, a parameter could take on the possible values of "slow" or "fast," if appropriate.

The message 600 may also include a delay tolerance parameter 610 that may include or be characterized by any or all of delayIndication, delayType, delayTolerantAccess or other suitable parameters. Accordingly, the delay tolerance parameter 610 may refer to whether or not the UE intends to or is capable of or configured to operate in a delay tolerant access mode. In such a mode, the UE may be capable of tolerating significant delay in the exchanging of data with the eNB. Such a delay may be on the order of multiple data frames, but also may be a larger value on the order of seconds, minutes, hours or even larger, and may depend on the nature of the MTC communication session.

The message 600 may also include a mobile originating data parameter 615 that may include or be characterized by any or all of dataAccess, dataOrigin, Mobile Originating Data only (moData) or other suitable parameters. Accordingly, the mobile originating data parameter 615 may refer to whether or not the data in the MTC communication session originates at the UE. In some cases, the data may exclusively originate at the UE, but is not so limited. In some cases, most or part of the data may originate at the UE.

The message 600 may also include a mobility status parameter 620 that may include or be characterized by any or all of mobilityStatus, mobilityIndication, mobilityType, stationaryDevice, notMobileDevice or other suitable parameters. Accordingly, the mobility status parameter 620 may refer to a configured mobility status of the UE. As an example, mobility status parameter 620 may reflect whether the UE is stationary or not. It should be noted that the term "stationary" may refer to a permanent condition of the UE or to a condition that may not be permanent but is expected while the UE engages in the MTC communication session.

The message 600 may also include an infrequent data transfer parameter 625 that may include or be characterized by any or all of deviceMode, deviceState, dataType, dataTransferType or other suitable parameters. Accordingly, the infrequent data transfer parameter 625 may refer to whether or not the UE intends to or is capable of or configured to operate using infrequent data transfer during the MTC communication session. The term "infrequent" may be appropriately defined based on the nature of the communication session. In some embodiments, an infrequent rate may refer to less than once per hour, but is certainly not limited as such. In some embodiments, the time period associated with an infrequent rate may be on the order of seconds or minutes or days.

The message 600 may also include a small data access parameter 630 that may include or be characterized by any or all of smallDataDevice, smallDataAccess or other suitable parameters. Accordingly, the small data access parameter 630 may refer to whether or not the UE intends to or is capable of or configured to exchange small blocks of data with the eNB as part of the MTC communication session. The term "small block" may refer to a data block that is 400 bytes or less, but is certainly not limited as such, and may be appropriately defined by the nature of the communication session. In some embodiments, the term "small block" may refer to a data block that is 1000 bytes or less. In some embodiments, the term "small block" may refer to a data block that ranges in size from 300 to 450 bytes. In some embodiments, the term "small block" may refer to a data block that is less than 2000 bytes.

The message 600 may also include a periodic data transfer parameter 635 that may include or be characterized by any or all of periodicTraffic, periodicAccess, periodicData or other suitable parameters. Accordingly, the periodic data transfer parameter 635 may refer to whether or not the UE intends to or is capable of or configured to connect with the eNB on a periodic basis or to exchange small blocks of data on a periodic basis with the eNB, which may be specified with a Boolean value. In addition, the periodic data transfer parameter 635 may also include a value for the periodicity, which may be given in any appropriate time unit such as number of frames, seconds, minutes, hours or the like.

The message 600 may also include a traffic behavior analysis capability parameter 640 that may include or be characterized by any or all of trafficPrediction, trafficEstimation or other suitable parameters. Accordingly, the traffic behavior analysis capability parameter 640 may refer to whether or not the UE intends to or is capable of or configured to utilize one or more algorithms to predict or estimate one or more traffic behaviors. Such behaviors may refer to exchanging of data with the eNB or other components which may or may not take place as part of the MTC communication session. In addition, such behaviors may refer to historical data exchanges or characterizations of such that may have been logged for purposes of the algorithms or other reason.

The message 600 may also include a power saving support parameter 645 that may include or be characterized by any or all of extremeDelayTolerant, powerSavingSupport, deepIdleSupport, unreachableSupport, dormantStateSupport or other suitable parameters. Accordingly, the power saving support parameter 645 may refer to whether or not the UE intends to or is capable of or configured to transition into a power saving mode in which the UE may be unreachable or non-communicative during a time period. The time period may be characterized by a power saving mode duration parameter that refers to the length of the time period in any suitable time unit, such as number of frames, seconds, minutes, hours or the like. Data exchanges with the UE (sending or receiving or both) that may normally take place during the time period or are requested or necessary during the time period may be delayed, in some embodiments, until the UE is no longer operating in the power saving mode. In some embodiments, the power saving mode duration parameter may be on the order of hours. In some embodiments, the power saving mode duration parameter may be on the order of the length of an extended Discontinuous Reception (DRX) cycle.

The message 600 may also include an RRC state transition support parameter 650 that may include or be characterized by rrcTransitionSupport or other suitable parameters. Accordingly, the RRC state transition support parameter 650 may refer to whether or not the UE intends to or is capable of or configured to support the use of algorithms providing assistance information to the eNB or the network regarding RRC state transition behavior. In some embodiments, techniques described herein related to the UE and the eNB cooperatively determining or using an appropriate value for the RRC inactivity timer may be applied.

Figure 7:
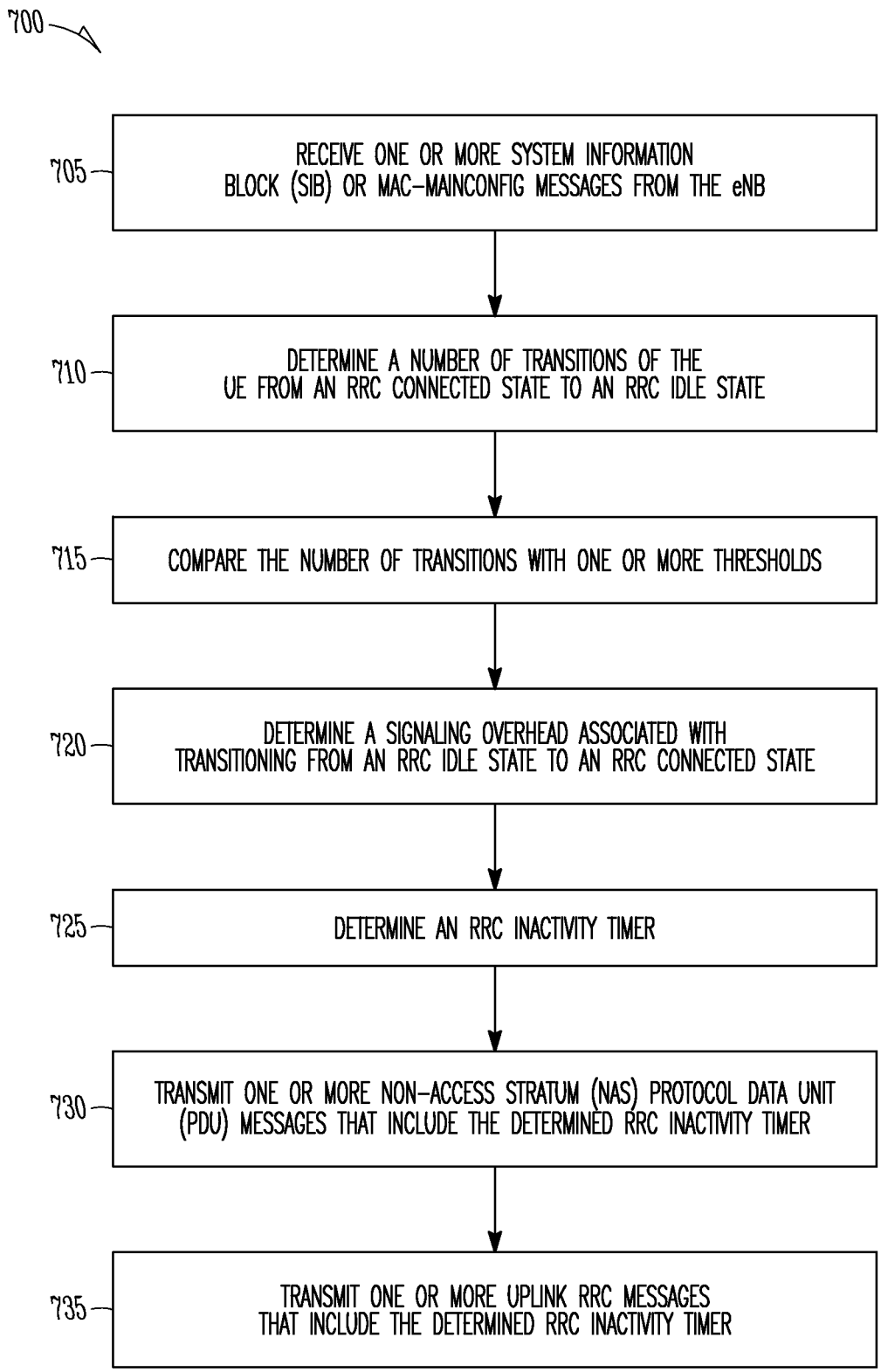
FIG. 7 illustrates the operation of another method for determining an RRC inactivity timer in accordance with some embodiments.

Referring to FIG. 7, a method 700 of determining an RRC inactivity timer (updated or otherwise) is shown. It is important to note that embodiments of the method 700 may include additional or even fewer operations or processes in comparison to what is illustrated in FIG. 7. In addition, embodiments of the method 700 are not necessarily limited to the chronological order that is shown in FIG. 7. In describing the method 700, reference may be made to FIGS. 1-6 and 8, although it is understood that the method 700 may be practiced with any other suitable systems, interfaces and components. The method 700 may take place at a UE, but is not limited as such, and may also take place at an eNB or at any suitable component internal or external to the system. In addition, while the method 700 and other methods described herein may refer to UE's or eNB's operating in accordance with 3GPP standards, embodiments of those methods are not limited to just those UE's or eNB's and may also be practiced on other mobile devices, base stations, access points or wireless networks operating in accordance with any suitable wireless protocols, including 802.11.

At operation 705 of the method 700, one or more SIB messages or MAC-MainConfig messages can be received from the eNB, and may enable an establishment and operation of an MTC communication between the UE and the eNB. At operation 710, a number of transitions of the UE from an RRC connected state to an RRC idle state may be determined, and the number of transitions may be compared to one or more thresholds at operation 715. A signaling overhead associated with the transitions may be determined at operation 720. In addition, an updated RRC inactivity timer may be determined at operation 725.

As previously described, the SIB or MAC-MainConfig messages may include information that enables the establishment, operation or improvement of an MTC communication between the UE and the eNB. Accordingly, the SIB or MAC-MainConfig messages may include values for thresholds to be used for comparison with the number of transitions of the UE from the RRC connected state to the RRC idle state. The SIB or MAC-MainConfig messages may also include one or more values for an RRC state transition time period, which can be durations of time over which the number of transitions is to be determined.

During the determination process, the UE and eNB may or may not be engaged in an MTC communication session. As an example, the UE and eNB may be in the process of establishing an MTC communication session, and the determination process may be intended to determine an initial value for an RRC inactivity timer to be used in the session. As another example, the UE and eNB may already be engaged in an MTC communication session that uses a current RRC inactivity timer, and the determination process may be intended to produce an updated value of the RRC inactivity timer to be used for the session. As such, the updated value may be considered an improved or more optimized value based on measurements of the actual communication taking place in the session or in recent past sessions.

In some embodiments, the number of transitions that occur during a time period of duration according to the RRC state transition time period may be counted, and the thresholds may be given in terms of similar numbers. In some embodiments, the thresholds may refer to percentages or fractions of time or other suitable values.

A signaling overhead associated with the transitions may be determined at operation 720. This overhead may be significant, at least in comparison to the amount of data to be sent. For example, if a small block of data is to be transmitted from the UE, the number of bits involved in the signaling overhead may be on the same order as the number of bits in the data block. In that case, the resulting overhead may be near 100%, which can be detrimental to the overall system, as the overall true system throughput may be sacrificed if many MTC sessions (at this device and/or other devices) are taking place. The amount of signaling overhead may be combined in any suitable manner or algorithm with the number of transitions between the RRC connected and RRC idle states to facilitate the determination of the RRC inactivity timer in 725. Accordingly, the determination may or may not use both of these operations or may use additional or alternate operations.

Figure 8:
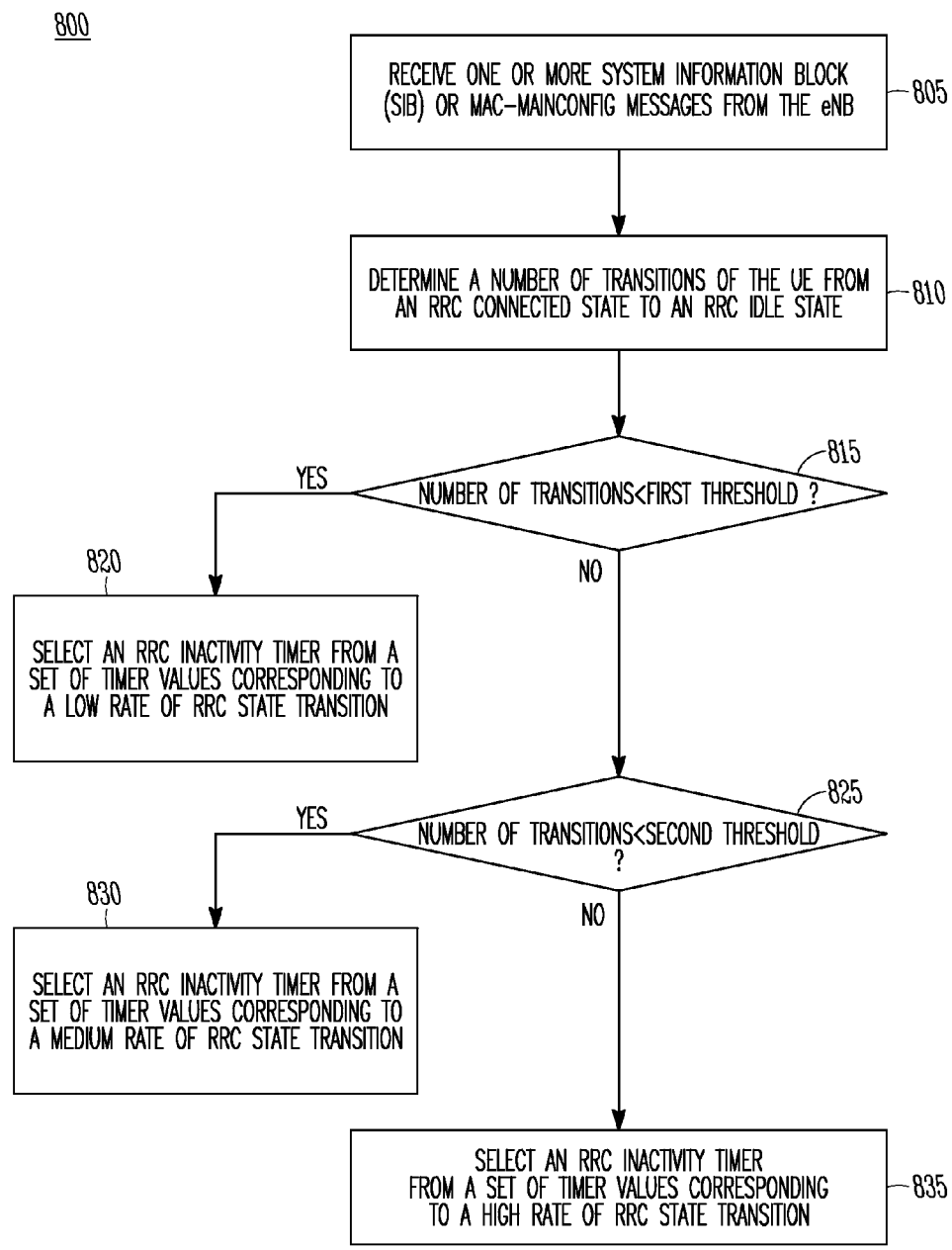
FIG. 8 illustrates the operation of another method for determining an RRC inactivity timer in accordance with some embodiments.

An example embodiment of a method 800 for determining an RRC timer (updated or otherwise) is shown in FIG. 8. At operation 805, one or more SIB or MAC-MainConfig messages are received from the eNB, and a number of transitions of the UE from an RRC connected state to an RRC idle state is determined at operation 810. In these operations, any previously described techniques may be used. At operation 815, the number of transitions is compared to a first threshold, and if the number of transitions is less than the first threshold, the method 800 proceeds to operation 820, at which the RRC inactivity timer is selected from a set of timer values corresponding to a low rate of RRC state transition. If the number of transitions is not less than the first threshold, it is compared to a second threshold at operation 825. Accordingly, if the number of transitions is less than the second threshold, the method proceeds to operation 830, at which the RRC inactivity timer is selected from a set of timer values corresponding to a medium rate of RRC state transition. If the number of transitions is not less than the second threshold, the method proceeds to operation 830, at which the RRC inactivity timer is selected from a set of timer values corresponding to a high rate of RRC state transition.

It should be noted that the method 800 utilizes two thresholds and three characterizations of the rate of RRC state transition, namely low, medium, and high. However, in some embodiments, similar techniques may be employed using any suitable number of thresholds and characterizations of the rate of RRC state transition. As an example, a single threshold may be used, and the rate of RRC state transition may be characterized as low or high. In this case, the method 800 can be modified to include operations 805-820 and operation 835, and to exclude operations 825 and 830. If the answer to the check at operation 820 is "no," the method in this case can proceed directly to operation 835.

A User Equipment (UE) is disclosed herein. The UE may be configured to operate in a 3GPP network in accordance with a communication protocol. In some embodiments, the communication protocol can be a Machine Type Communication (MTC) protocol and the UE can be an MTC device. The UE may comprise hardware processing circuitry configured to transmit a UE radio capability message that is receivable by an eNB and that enables the exchanging of data between the UE and the eNB according to the communication protocol. The UE radio capability message may include a small data access parameter that specifies a capability of the UE to exchange small blocks of data with the eNB as part of the communication protocol. The UE radio capability message may also include a mobile originating data parameter that specifies a capability of the UE to support a mode in which data to be exchanged as part of the communication protocol originates at the UE.

The UE radio capability message may further include a power saving support parameter that specifies a capability of the UE to operate in a power saving mode during a time period defined by a power saving mode duration parameter as part of the communication protocol, wherein the UE is further configured to refrain from exchanging of data during the time period, and wherein the UE is further configured to delay exchanging of data requested to occur during the time period at least until the UE is no longer operating in the power saving mode. The UE radio capability message may further include a delay tolerance parameter that specifies a capability of the UE to operate in a delay tolerant mode as part of the communication protocol. The UE radio capability message may further include a mobility status parameter that specifies a mobility status of the UE while the UE operates according to the communication protocol. The UE radio capability message may further include an infrequent data transfer parameter that specifies a capability of the UE to exchange data with the eNB at an infrequent rate as part of the communication protocol. The UE radio capability message may further include periodic data transfer parameter that specifies a capability of the UE to exchange data with the eNB in a periodic manner as part of the communication protocol.

The UE radio capability message may further include a traffic behavior analysis capability parameter that specifies a capability of the UE to analyze, according to at least one algorithm internal to the UE, exchanges of data that occur while the UE operates according to the communication protocol. The UE radio capability message may further include a Radio Resource Control (RRC) state transition support parameter that specifies a capability of the UE to determine RRC state transition information related to the transitions of the UE between an RRC idle state and another RRC state while the UE operates according to the communication protocol. In some embodiments of the UE radio capability message, the infrequent rate may be less than once per hour and a small block of data may include 400 bytes or less.

A method of determining, at a User Equipment (UE), an updated Radio Resource Control (RRC) inactivity timer for a communication between the UE and an Evolved Node B (eNB) is also disclosed herein. In some embodiments of the method, the UE and the eNB may be configured to operate in a 3GPP network according to a communication protocol. In some embodiments, the communication protocol can be a Machine Type Communication (MTC) protocol. The method may include determining a number of transitions of the UE from an RRC connected state to an RRC idle state that occur during an RRC state transition time period. The method may further include performing a comparison of the number of transitions with one or more thresholds and determining, at least partly based on the comparison, the updated RRC inactivity timer. In some embodiments, transitioning of the UE from the RRC connected state to the RRC idle state may occur in response to an expiration of a current RRC inactivity timer.

In some embodiments, determining the updated RRC inactivity timer may include selecting, when the number of transitions is less than a first threshold, the updated RRC inactivity timer from a set of timer values corresponding to a low rate of RRC state transition. In some embodiments, determining the updated RRC inactivity timer may include selecting, when the number of transitions is not less than the first threshold and is less than a second threshold, the updated RRC inactivity timer from a set of timer values corresponding to a medium rate of RRC state transition and selecting, when the number of transitions is not less than the second threshold, the updated RRC inactivity timer from a set of timer values corresponding to a high rate of RRC state transition. In some embodiments, determining the updated RRC inactivity timer may include selecting, when the number of transitions is not less than the first threshold, the updated RRC inactivity timer from a set of timer values corresponding to a high rate of RRC state transition.

The method may further include determining a signaling overhead associated with the transitioning of the UE from the RRC connected state to the RRC idle state, and in some embodiments, determining the updated RRC inactivity timer may be further based at least partly on the signaling overhead. The method may also include receiving one or more System Information Block (SIB) or MAC-MainConfig messages from the eNB. In some embodiments, the messages may include values for the first or second thresholds or the RRC state transition time period. In some embodiments, the messages may include sets of timer values corresponding to the low, medium, and high rates of RRC state transition.

The method may also include transmitting, in response to the determination of the updated RRC inactivity timer, one or more Non-Access Stratum (NAS) Protocol Data Unit (PDU) messages or uplink RRC messages receivable by the eNB. In some embodiments, the messages may include the updated RRC inactivity timer.

Another User Equipment (UE) is disclosed herein. The UE may be configured to operate in a 3GPP network in accordance with a Radio Resource Control (RRC) inactivity timer that controls RRC state transitions of the UE. The UE may be further configured to operate in accordance with a Machine Type Communication (MTC) mode of operation. The UE may comprise hardware processing circuitry configured to receive one or more System Information Block (SIB) or MAC-MainConfig messages from an Evolved Node B (eNB) that is in a communication session with the UE. In some embodiments, the messages may include an RRC inactivity timer support value that indicates if the communication session supports the use of the RRC inactivity timer and a set of candidate RRC inactivity timer values. The messages may further include an RRC inactivity timer keep connected support value that indicates if the communication session supports a keep connected mode as part of the communication session. In some embodiments, when the UE operates in keep connected mode, the UE operates in an RRC connected state and is restricted from operating in other RRC states.

The hardware processing circuitry may be further configured to select, from the set of candidate RRC inactivity timer values, an RRC inactivity timer value for use in the communication session and to transmit the selected candidate RRC inactivity timer value to the eNB. In some embodiments, the transmission may include transmission as part of a dedicated uplink message or an RRC control message. In some embodiments, the messages may further include an RRC inactivity timer adjustment support value that indicates if the communication session supports requests from the UE to adjust a current RRC inactivity timer to produce an updated RRC inactivity timer for use in the communication session. The hardware processing circuitry may be further configured to select the keep connected mode as a mode of operation for the UE during the communication session or to adjust the current RRC inactivity timer value to produce an updated RRC inactivity timer for use in the communication session and to transmit the selection of the keep connected mode to the eNB. In some embodiments, the transmission may include transmission as part of a dedicated uplink message or an RRC control message. In some embodiments, the set of candidate RRC inactivity timer values may include infinity, and when infinity is used as the value for the RRC inactivity timer, the UE may be disabled from leaving the RRC connected state during the communication session. In some embodiments, the selection of the RRC inactivity timer value for use in the communication session may be based at least partially on a characterization of data traffic exchanged as part of the communication session or on a number of RRC state transitions occurring during the communication session.

A non-transitory computer-readable storage medium is disclosed herein. The non-transitory computer-readable storage medium may store instructions for execution by one or more processors to perform operations to configure a UE to transmit a UE radio capability message that is receivable by an eNB and that enables the exchanging of data between a UE and the eNB according to a communication protocol. In some embodiments, the communication protocol can be a Machine Type Communication (MTC) protocol and the UE can be an MTC device. In some embodiments, the UE radio capability message may include a small data access parameter that specifies a capability of the UE to exchange small blocks of data with the eNB as part of the communication protocol and a mobile originating data parameter that specifies a capability of the UE to support a mode in which data to be exchanged as part of the communication protocol originates at the UE. The UE radio capability message may further include a power saving support parameter that specifies a capability of the UE to operate in a power saving mode during a time period defined by a power saving mode duration parameter as part of the communication protocol. In some embodiments, exchanging of data may not occur during the time period, and any exchanging of data requested to occur during the time period may be delayed at least until the UE is no longer operating in the power saving mode.

The UE radio capability message may further include at least one of a delay tolerance parameter that specifies a capability of the UE to operate in a delay tolerant mode as part of the communication protocol and a mobility status parameter that specifies a mobility status of the UE while the UE operates according to the communication protocol. The UE radio capability message may further include at least one of an infrequent data transfer parameter that specifies a capability of the UE to exchange data with the eNB at an infrequent rate as part of the MTC protocol and a periodic data transfer parameter that specifies a capability of the UE to exchange data with the eNB in a periodic manner as part of the communication protocol.

The UE radio capability message may further include a traffic behavior analysis capability parameter that specifies a capability of the UE to analyze, according to at least one algorithm internal to the UE, exchanges of data that occur while the UE operates according to the communication protocol. The UE radio capability message may further include a Radio Resource Control (RRC) state transition support parameter that specifies a capability of the UE to determine RRC state transition information related to the transitions of the UE between an RRC idle state and another RRC state while the UE operates according to the communication protocol. In some embodiments, the infrequent rate may be less than once per hour and a small block of data may include 400 bytes or less.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A User Equipment (UE) configured to operate in a $3^{rd}$ Generation Partnership Project (3GPP) network in accordance with a communication protocol, the UE comprising hardware processing circuitry, the hardware circuitry comprising:
   a memory device; and
   a processor coupled to the memory device, the processor configured to:
      receive from an Evolved Node-B (eNB) a message comprising a Boolean Radio Resource Control (RRC) inactivity timer keep connected support value;
      transmit a UE radio capability message that is receivable by the eNB and that enables the exchanging of data between the UE and the eNB according to the communication protocol;
      wherein the UE radio capability message includes:
         a small data access parameter that specifies a capability of the UE to exchange small blocks of data with the eNB as part of the communication protocol; and
         a mobile originating data parameter that specifies a capability of the UE to support a mode in which data to be exchanged as part of the communication protocol originates at the UE;
      determine whether to operate the UE in a keep connected mode in which the UE operates in an RRC connected state and is restricted from operating in other RRC states;
      determine whether to adjust a current RRC inactivity timer based on the Boolean RRC inactivity timer keep connected support value and, if so, adjust the current RRC inactivity timer to produce an updated RRC inactivity timer; and
      transmit the updated RRC inactivity timer to the eNB.

2. The UE according to claim 1, wherein the UE radio capability message further includes a power saving support parameter that specifies a capability of the UE to operate in a power saving mode during a time period defined by a power saving mode duration parameter as part of the communication protocol,
   wherein the UE is further configured to refrain from exchanging of data during the time period, and
   wherein the UE is further configured to delay exchanging of data requested to occur during the time period at least until the UE is no longer operating in the power saving mode.

3. The UE according to claim 1, wherein the UE radio capability message further includes:

a delay tolerance parameter that specifies a capability of the UE to operate in a delay tolerant mode as part of the communication protocol.

4. The UE according to claim 1, wherein the UE radio capability message further includes:
an infrequent data transfer parameter that specifies a capability of the UE to exchange data with the eNB at an infrequent rate as part of the communication protocol.

5. The UE according to claim 4, wherein the infrequent rate is less than once per hour and a small block of data includes 400 bytes or less.

6. The UE according to claim 1, wherein the UE radio capability message further includes:
a traffic behavior analysis capability parameter that specifies a capability of the UE to analyze, according to at least one algorithm internal to the UE, exchanges of data that occur while the UE operates according to the communication protocol.

7. The UE according to claim 1, wherein the UE is a Machine Type Communication (MTC) device and wherein the communication protocol is an MTC protocol.

8. The UE according to claim 1, wherein:
the message from the eNB further comprises a set of candidate RRC inactivity timer values and a Boolean RRC inactivity timer adjustment support value, and
the determination of whether to adjust the current RRC inactivity timer is further based on the Boolean RRC inactivity timer adjustment support value and the updated RRC inactivity timer is based on the set of candidate RRC inactivity timer values.

9. The UE according to claim 1, wherein the UE radio capability message further includes:
a mobility status parameter that specifies a mobility status of the UE while the UE operates according to the communication protocol.

10. The UE according to claim 1, wherein the UE radio capability message further includes:
a periodic data transfer parameter that specifies a capability of the UE to exchange data with the eNB in a periodic manner as part of the communication protocol.

11. The UE according to claim 1, wherein the UE radio capability message further includes:
an RRC state transition support parameter that specifies a capability of the UE to determine RRC state transition information related to the transitions of the UE between an RRC idle state and another RRC state while the UE operates according to the communication protocol.

12. The UE according to claim 1, wherein:
the message from the eNB is one of a MAC-MainConfig message and a System Information Block (SIB) message, each of which comprises the Boolean RRC inactivity timer keep connected support value, and
the hardware processing circuitry is further configured to receive the other of the MAC-MainConfig message and the SIB message prior to transmitting the updated RRC inactivity timer to the eNB.

13. A non-transitory computer-readable storage medium that stores instructions for execution by one or more processors to perform operations to configure a User Equipment (UE) to:
receive from an Evolved Node-B (eNB) a message comprising a Boolean Radio Resource Control (RRC) inactivity timer keep connected support value;
transmit a UE radio capability message that is receivable by the eNB and that enables the exchanging of data between a UE and the eNB according to a communication protocol;

wherein the UE radio capability message includes:
a small data access parameter that specifies a capability of the UE to exchange small blocks of data with the eNB as part of the communication protocol; and
a mobile originating data parameter that specifies a capability of the UE to support a mode in which data to be exchanged as part of the communication protocol originates at the UE;
determine whether to operate the UE in a keep connected mode in which the UE operates in an RRC connected state and is restricted from operating in other RRC states;
determine whether to adjust a current RRC inactivity timer based on the Boolean RRC inactivity timer keep connected support value and, if so, adjust the current RRC inactivity timer to produce an updated RRC inactivity timer; and
transmit the updated RRC inactivity timer to the eNB.

14. The non-transitory computer-readable storage medium according to claim 13, wherein the UE radio capability message further includes a power saving support parameter that specifies a capability of the UE to operate in a power saving mode during a time period defined by a power saving mode duration parameter as part of the communication protocol, wherein exchanging of data does not occur during the time period, and any exchanging of data requested to occur during the time period is delayed at least until the UE is no longer operating in the power saving mode.

15. The non-transitory computer-readable storage medium according to claim 13, wherein the UE radio capability message further includes:
a delay tolerance parameter that specifies a capability of the UE to operate in a delay tolerant mode as part of the communication protocol.

16. The non-transitory computer-readable storage medium according to claim 13, wherein the UE radio capability message further includes:
an infrequent data transfer parameter that specifies a capability of the UE to exchange data with the eNB at an infrequent rate as part of the communication protocol.

17. The non-transitory computer-readable storage medium according to claim 16, wherein the infrequent rate is less than once per hour and a small block of data includes 400 bytes or less.

18. The non-transitory computer-readable storage medium according to claim 13, wherein the UE radio capability message further includes:
a traffic behavior analysis capability parameter that specifies a capability of the UE to analyze, according to at least one algorithm internal to the UE, exchanges of data that occur while the UE operates according to the communication protocol.

19. The non-transitory computer-readable storage medium according to claim 13, wherein the communication protocol is a Machine Type Communication (MTC) protocol and the UE is an MTC device.

20. The non-transitory computer-readable storage medium according to claim 13, wherein:
the message from the eNB further comprises a set of candidate RRC inactivity timer values and a Boolean RRC inactivity timer adjustment support value, and
the determination of whether to adjust the current RRC inactivity timer is further based on the Boolean RRC inactivity timer adjustment support value and the updated RRC inactivity timer is based on the set of candidate RRC inactivity timer values.

21. The non-transitory computer-readable storage medium according to claim 13, wherein the UE radio capability message further includes:
- a mobility status parameter that specifies a mobility status of the UE while the UE operates according to the communication protocol.

22. The non-transitory computer-readable storage medium according to claim 13, wherein the UE radio capability message further includes:
- a periodic data transfer parameter that specifies a capability of the UE to exchange data with the eNB in a periodic manner as part of the communication protocol.

23. The non-transitory computer-readable storage medium according to claim 13, wherein the UE radio capability message further includes:
- an RRC state transition support parameter that specifies a capability of the UE to determine RRC state transition information related to the transitions of the UE between an RRC idle state and another RRC state while the UE operates according to the communication protocol.

24. The non-transitory computer-readable storage medium according to claim 13, wherein:
- the message from the eNB is one of a MAC-MainConfig message and a System Information Block (SIB) message, each of which comprises the Boolean RRC inactivity timer keep connected support value, and
- the hardware processing circuitry is further configured to receive the other of the MAC-MainConfig message and the SIB message prior to transmitting the updated RRC inactivity timer to the eNB.

* * * * *